US012798267B2

(12) United States Patent
Campanini

(10) Patent No.: US 12,798,267 B2
(45) Date of Patent: Nov. 17, 2026

(54) WIRELESS CONNECTION DEVICE AND METHOD

(71) Applicant: CUSTOM S.P.A., Fontevivo (IT)

(72) Inventor: Alberto Campanini, Fidenza (IT)

(73) Assignee: CUSTOM S.P.A., Fontevivo (IT)

( * ) Notice: Subject to any disclaimer, the term of this patent is extended or adjusted under 35 U.S.C. 154(b) by 169 days.

(21) Appl. No.: 18/870,071

(22) PCT Filed: Jun. 8, 2023

(86) PCT No.: PCT/IB2023/055925
§ 371 (c)(1),
(2) Date: Nov. 27, 2024

(87) PCT Pub. No.: WO2023/248043
PCT Pub. Date: Dec. 28, 2023

(65) Prior Publication Data

US 2025/0367946 A1 Dec. 4, 2025

(30) Foreign Application Priority Data

Jun. 20, 2022 (IT) ........................ 102022000013024

(51) Int. Cl.
*B41J 11/00* (2006.01)
*B65H 26/06* (2006.01)

(52) U.S. Cl.
CPC .......... *B41J 11/0075* (2013.01); *B65H 26/06* (2013.01); *B65H 2557/11* (2013.01)

(58) Field of Classification Search
CPC ........ B41J 11/0075; B41J 11/42; B41J 15/02; B65H 26/06; B65H 26/08; B65H 2404/724; B65H 2557/11
See application file for complete search history.

(56) References Cited

U.S. PATENT DOCUMENTS 4,892,426 A * 1/1990 Steele ...................... B41J 15/06 250/548
5,228,792 A * 7/1993 Crevecoeur .............. B41J 29/48 271/265.02
2008/0238689 A1 10/2008 Ohashi

FOREIGN PATENT DOCUMENTS

EP 2 020 294 A1 2/2009
EP 2 390 100 A1 11/2011
(Continued)

OTHER PUBLICATIONS

Sep. 13, 2023 Search Report issued in International Patent Application No. PCT/IB2023/055925.
(Continued)

*Primary Examiner* — Anh T Vo
(74) *Attorney, Agent, or Firm* — Oliff PLC

(57) ABSTRACT

A device and a method for making a wireless connection between a paper sensor in a roll holder and a printing device which receives a printing medium from the roll holder, in which a magnet arranged on the roll holder performs, with each turn of the pin of the roll holder, a cyclical movement which includes first a lifting of the magnet, caused by a rotation of the pin by a fraction of a turn, and then a fall by gravity of the magnet which falls near a coil which is energized by the mechanical energy of the magnet for supplying electrical energy to an emitter in wireless communication with a receiver to receive a signal with each revolution of the pin to count the revolutions made by the pin and act as a paper sensor.

19 Claims, 2 Drawing Sheets

(56) References Cited

FOREIGN PATENT DOCUMENTS

| | | | |
|---|---|---|---|
| EP | 3 974 359 | A1 | 3/2022 |
| JP | 2007-191253 | A | 8/2007 |

OTHER PUBLICATIONS

Sep. 13, 2023 Written Opinion of the International Searching Authority issued in International Patent Application No. PCT/IB2023/055925.

* cited by examiner

WIRELESS CONNECTION DEVICE AND METHOD

BACKGROUND OF THE INVENTION

The invention relates to a device and a method for the wireless connection of a paper sensor in a roll holder, in particular for the wireless connection between a printing device and a paper sensor in a roll holder, wherein the roll holder feeds a print medium (such as a strip of paper unwound from a roll) to the printing device itself.

Specifically, but not exclusively, the invention can serve to provide wireless information relating to the number of revolutions made by the roll holder pin in the context of a printing apparatus in which the printing device and the roll holder are separated, in particular in order to act as a paper sensor capable of detecting the presence of paper and/or the amount of paper reserve in the roll holder.

In particular, reference is made to a device made as in the preamble of claim 1. Such a device is disclosed by the patent publication EP 2390100 A1.

A printing apparatus is known, for example an automatic kiosk or ticket, receipt and coupon dispenser, in which the printing device and the roll holder, which supplies the printing device with a printing medium, are mounted separately from each other. The roll (usually of paper) is coupled manually to the printing device. The roll holder is normally equipped with a paper sensor which signals that the print medium is about to run out.

A drawback of the printing apparatuses of the prior art is that, in general, the roll holder must be connected to the printing device by means of an electric cable, for example to allow the operation of the paper sensor.

SUMMARY OF THE INVENTION

An object of the invention is to provide a device and/or a method capable of overcoming the aforementioned drawback of the prior art.

An object of the invention is to realize a device and/or a method which allow a connection between a paper sensor of a roll holder and a printing device and which are alternative to those of the prior art.

One advantage is to provide a device and/or a method and/or an apparatus which implement a wireless link between a paper sensor in a roll holder and a printing device wherein the wireless link does not require the use of a power supply coming from a battery associated with the roll holder.

One advantage is to allow wireless communication so as to transmit information relating to the revolutions made by a pin of the roll holder during the feeding of the print support to a printing device, in particular with the possibility of signaling the approaching of an end-of-roll situation.

An advantage is to provide a constructively simple and economical device for wireless connection of a paper sensor of a roll holder to a printing device fed by the roll holder.

These objects and advantages, and others still, are achieved by a device and/or by a method and/or by an apparatus according to one or more of the claims set out below.

In one example, a device, for carrying out a wireless connection of a paper sensor of a roll holder with a printing device fed by the roll holder, comprises a magnet arranged on the roll holder to make, at each turn of the pin of the roll holder, a cyclic motion that includes first a lifting of the magnet, caused by a rotation of the pin by a fraction of a turn, and then a gravity drop of the magnet which falls in proximity to a coil which is energized by the mechanical energy of the magnet in fall to supply electrical energy to an emitter in wireless communication with a receiver that can receive a signal at each revolution of the roll holder pin to count the revolutions completed.

The wireless communication device in question may act, in particular, as a paper sensor, i.e. as a sensor for the presence of paper in the roll holder and/or as a sensor for the reserve of paper left in the roll holder. The information provided by the wireless device, relating to the number of revolutions completed by the roll holder, together with information relating to the initial condition of the roll carried by the roll holder (for example the initial total turns of the roll), will in fact allow performing the aforementioned paper sensor function.

BRIEF DESCRIPTION OF THE DRAWINGS

The invention can be better understood and implemented with reference to the accompanying drawings which illustrate a non-limiting example of implementation, in which.

DETAILED DESCRIPTION

Figure 1:
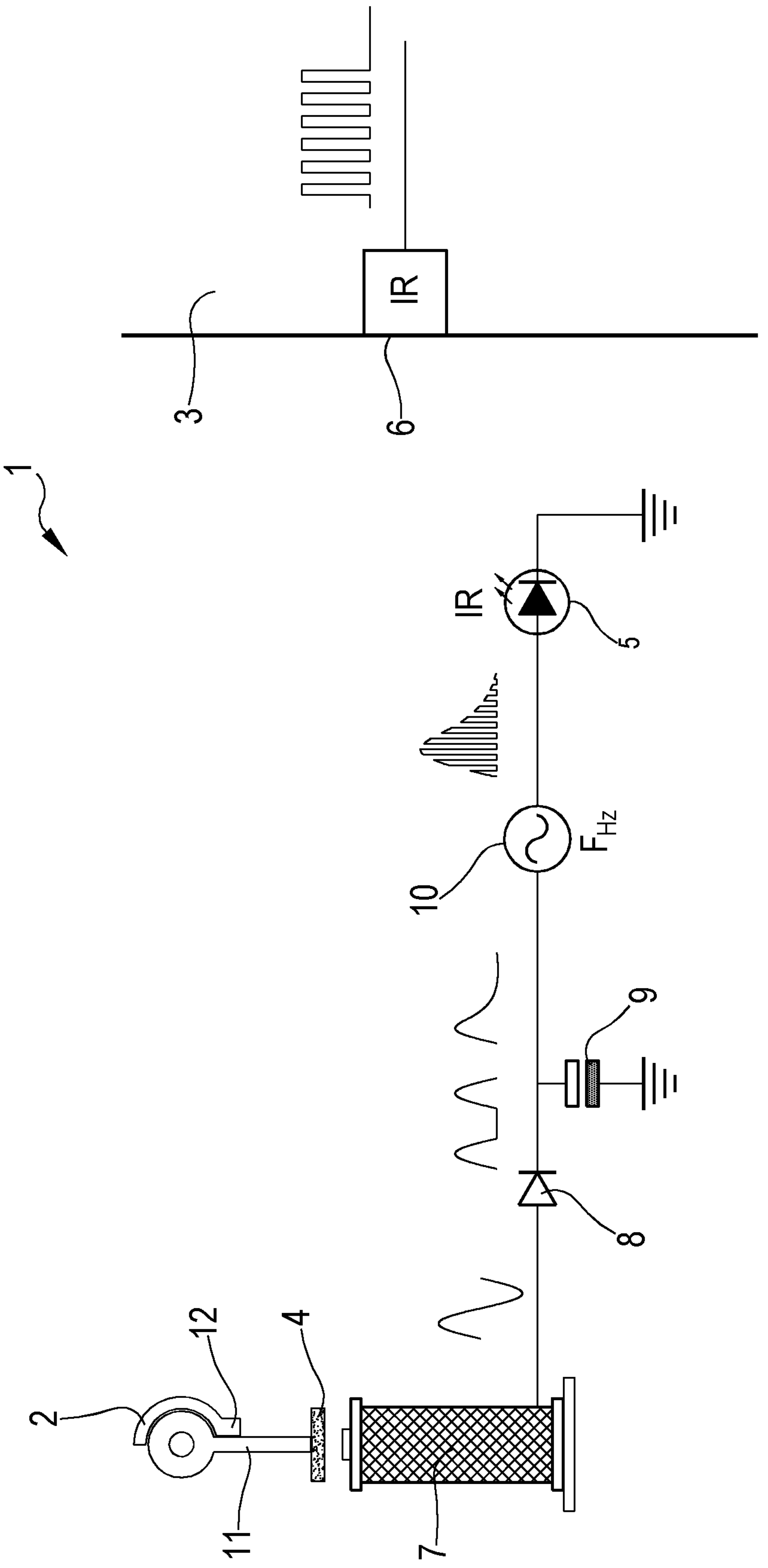
FIG. 1 is a diagram indicative of the operation of an example of a device made in accordance with the present invention.
Figure 3:
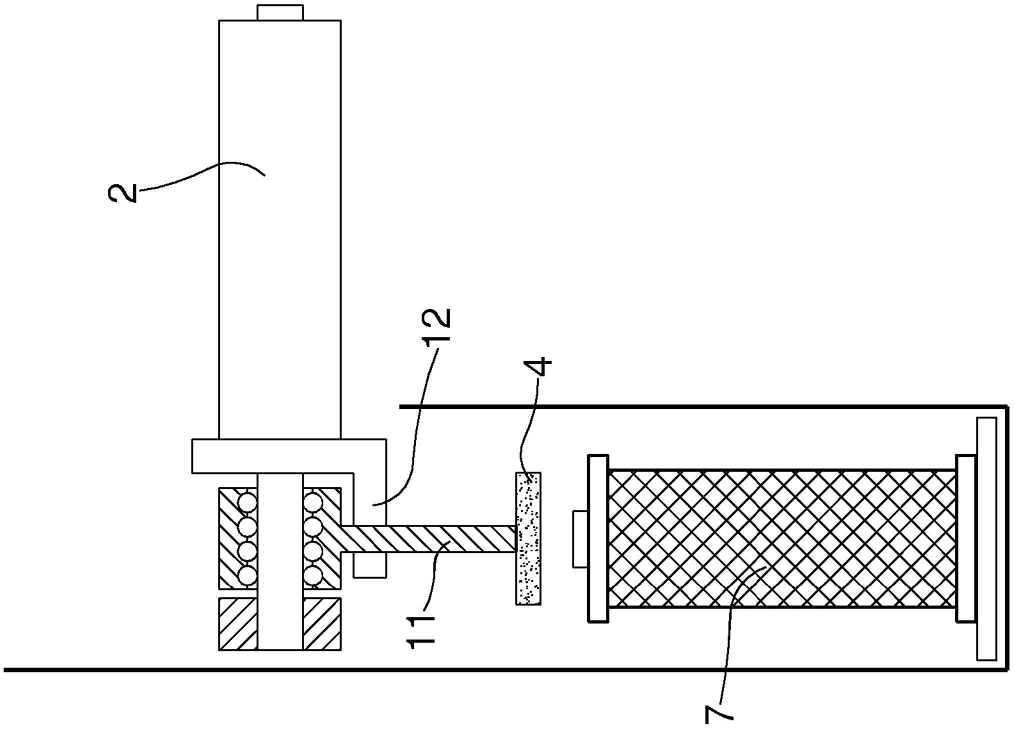
FIG. 3 is a schematic side view, in vertical elevation, of the device in the configuration shown in FIG. 1.

With reference to the aforementioned figures, the reference numeral 1 indicates as a whole a connection device for the wireless connection of a paper sensor in a roll holder provided with a pin 2 which supports the roll and which rotates around a rotation axis. The paper sensor, which will be better described in the continuation of the description, may be connected wirelessly with a printing device 3 which is fed with a printing medium (for example, paper) which is unwound from a roll carried by the aforementioned pin 2 of the roll holder.

Figure 2:
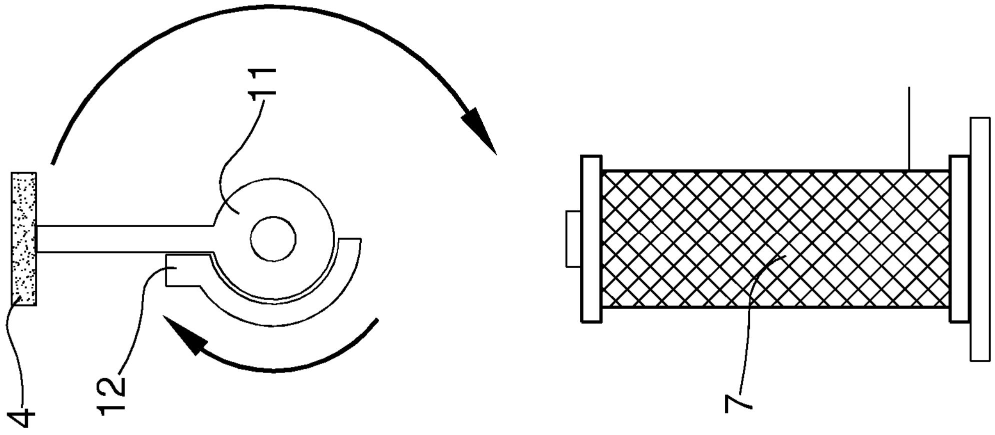
FIG. 2 is an enlarged detail of FIG. 1 showing the device in a different operating configuration.

The connection device 1 comprises a magnet 4 arranged on the roll holder in such a way as to carry out, with each turn of the pin 2 of the roll holder, a cyclical movement which first includes a lifting of the magnet 4 (see FIG. 2), caused by a rotation of the pin 2 by a fraction of a turn (for example about half a turn), and then a fall due to gravity of the magnet 4 itself (before pin 2 completes a complete turn). The lifting causes the magnet 4 to assume, in its cyclical movement guided by the pin 2, an upper position from which it will then fall due to its own weight. In particular, the lifting movement of the magnet 4 takes place relatively slowly compared to the falling movement due to gravity which takes place more rapidly.

The connection device 1 comprises an electric circuit arranged to be energized by the magnet 4 each time the aforesaid fall by gravity occurs (exploiting the kinetic energy of the falling magnet 4).

The electric circuit comprises an emitter 5 for wireless communication. The emitter 5 may comprise, in particular, an infrared emitter. The emitter 5 may comprise, in particular, an infrared emission diode. In other examples, the emitter may comprise, in particular, a radio wave emitter for transmitting a radio frequency pulse.

The connection device 1 may comprise, in particular, a receiver 6 configured to receive from the aforesaid emitter 5 at least one signal indicating that the magnet 4 has fallen. This signal may be used as an indication that a turn of the pin 2 has been completed.

The electric circuit may comprise, in particular, a coil 7 close to a falling area of the magnet 4 and arranged to generate—thanks to the movement of the falling magnet 4—electric energy used to activate the aforesaid emitter 5.

The electric circuit may comprise, in particular, means for transforming a signal (for example a voltage signal) at the output of the coil 7 into a input signal usable by the emitter 5. Such means for transforming may comprise, in particular, a rectifier 8, for example a diode, configured to transform a sinusoidal wave signal (generated by the coil 7 when the magnet 4 falls near the coil itself) into a pulsating wave signal. Such means for transforming may comprise, in particular, a filter 9, for example a capacitor, configured to reduce the oscillations of the pulsating wave signal at the output of the rectifier 8. Such means for transforming may comprise, in particular, an oscillator 10 which is connected to an output of the filter 9 and which is configured to drive the emitter 5.

The connecting device 1 may comprise, in particular, a support 11 to which the magnet 4 is attached. The connecting device 1 may comprise, in particular, a pawl 12 which rotates together with the roll holder 2 to push the support 11 and lift the magnet 4.

The pawl 12 is arranged so as to raise the magnet 4 by effect of a rotation of the pin 2 of the roll holder in the direction of unrolling or unwinding of the roll of the print support (paper) from the roll holder. In particular, the roll may be unwound by the printing device 3 (for example by roller means) to perform the normal printing operations on the print support.

The support 11 and the magnet 4 carried by the support 11 may be, in particular, rotatable around a non-barycentric rotation axis (in particular, the magnet 4 will be distant from the rotation axis), so that the aforementioned lifting and the aforesaid fall of the magnet 4 may comprise, in particular, at least one oscillation around the aforesaid non-barycentric axis (in practice, the magnet 4 may perform a pendulum movement). This non-barycentric rotation axis may be, in particular, coaxial with the rotation axis of the aforementioned pin 2 of the roll holder.

The support 11 may comprise, in particular, an arm extended radially, with reference to the rotation axis of the roll holder 2. The magnet 4 may be arranged, in particular, at one end of the arm. The other end of the arm may be joined, for example, to a hub. The pawl 12 may be, in particular, integrally connected to the pin 2 of the roll holder. The pawl 12 is shaped and arranged in such a way as to push the support 11 which carries the magnet 4 upwards during a fraction (approximately half) of the turn of the pin 2 (during the unwinding of the roll) and in such a way as to leave free the support 11 in the remaining fraction of the turn of the pin 2, so as to cause the rapid fall of the magnet 4.

The connection device 1 may comprise, in particular, the printing device 3 (for example a thermal printing device), on which the aforementioned receiver 6 may be arranged, or with which it may be associated. The printing device 3 may be, in particular, fed with a roll of print support coming from the roll holder on which the aforementioned magnet 4 is arranged.

It is possible to provide a printing apparatus which comprises the printing device 3, the roll holder with the pin 2 for feeding the roll of printing medium to the printing device 3, and the connection device 1 for implementing a wireless connection of the paper sensor located on the roll holder and thus supply revolution counter information of the pin 2 of the roll holder and, therefore, by combining the information relating to the overall coils of the roll carried by the roll holder, perform a function of a real paper sensor, in particular presence and/or reserve paper.

The operation of the connection device 1 implements a method for wireless connection of the paper sensor. This method comprises the step of associating the magnet 4 to the roll holder by causing the magnet 4 to perform, with each turn of the pin 2 of the roll holder, a cyclic movement which first includes a lifting of the magnet 4, caused by a rotation of the pin 2 by one fraction of a turn, and then a gravity fall of the magnet 4.

The method may comprise, in particular, the step of energizing an electric circuit due to the gravity fall of the magnet 4 by transforming the mechanical energy of the fall of the magnet 4 into electric energy used by an emitter 5 in wireless communication with a receiver, so as to send, from the roll holder, remote information indicative of each completion of a turn of the pin 2 of the roll holder.

The connection device 1 may be used, in particular, in the context of a printing apparatus in which the roll holder is separate from the printing device 3. In this case, the roll holder can be operatively associated with the printing device 3, loading the roll (of paper) carried by the pin 2 of the roll holder onto the printing device, in particular by coupling one end of the strip unrolled from the roll to the drive means (for example of the roller type) which drives the paper. During operation of the printing device 3, the roll will be unwound from the roll holder and therefore the pin 2 of the roll holder will rotate on itself causing the cyclical movement (lifting and falling) of the magnet 4, with consequent energization of the circuit and sending of revolution counter signals of the pin 2. These signals can be sent by the connection device 1 to control means (electronic and programmable) of the printing device 3, without the need to make any electrical connection of the roll holder by means of cables. The knowledge of the characteristics of the roll (for example the initial number of turns of the roll), combined with the revolution counter information, will allow the control means to signal the approaching situation of the end of the roll.

The invention claimed is:

1. A connection device for wireless connection of a roll holder, the connection device comprising an electric circuit comprising an emitter for wireless communication to send at least one signal, and a receiver in wireless connection with the emitter, wherein the connection device comprises a magnet arranged on the roll holder to perform, at each turn of a pin of the roll holder, a cyclic movement which first includes a lifting of the magnet, caused by a rotation of the pin of a fraction of a turn, and then a falling of the magnet, the electric circuit being arranged to be energized by the magnet when the falling occurs.

2. The device according to claim 1, wherein the connection device is used for wireless connection of a paper sensor in a roll holder with a printing device fed by the roll holder.

3. The device according to claim 1, wherein the at least one signal is sent at each fall of the magnet, that is at each turn of the pin, with the possibility of acting as a roll holder revolution counter and therefore paper sensor.

4. The device according to claim 1, wherein the electric circuit comprises a coil close to a fall zone of the magnet to generate electric energy used to activate the emitter.

5. The device according to claim 4, wherein the electric circuit comprises means for transforming an output signal from the coil into a signal usable as input by the emitter.

6. The device according to claim 5, wherein the means for transforming comprises at least one rectifier.

7. The device according to claim 5, wherein the means for transforming comprises at least one filter.

8. The device according to claim 5, wherein the means for transforming comprises at least one oscillator to drive the emitter.

9. The device according to claim 1, wherein the emitter comprises an infrared emitter.

10. The device according to claim 1, wherein the emitter comprises a radio frequency emitter.

11. The device according to claim 1, comprising a support to which the magnet is attached.

12. The device according to claim 11, comprising a pawl which rotates with the pin of the roll holder to push the support and lift the magnet.

13. The device according to claim 11, wherein the support and the magnet are rotatable about a non-barycentric axis, the lifting and the falling comprising a rotation about the non-barycentric axis.

14. The device according to claim 13, comprising the roll holder on which the magnet is arranged, wherein the non-barycentric axis is coaxial with an axis of the roll holder.

15. The device according to claim 1, comprising the roll holder on which the magnet is arranged.

16. The device according to claim 1, comprising a printing device to which the receiver is associated, the printing device being fed with a roll of a print media coming from the roll holder on which the magnet is arranged.

17. The printing apparatus comprising a printing device, a roll holder with a pin for supplying a roll of a printing media to the printing device, and a device for wireless connection according to claim 1.

18. A method for wirelessly connecting a paper sensor in a roll holder, the method comprising:

associating a magnet to a roll holder making the magnet perform a cyclical movement at each turn of a pin of the roll holder, which first includes a lifting of the magnet, caused by a rotation of the pin of a fraction of a turn, and then a falling of the magnet;

energizing an electric circuit due to the falling of the magnet by transforming the mechanical energy of the falling magnet into electrical energy used by an emitter in wireless communication with a receiver so as to obtain information on the revolutions made by the pin so as to perform the function of paper sensor.

19. The method according to claim 18, the method being actuated by a connection device comprising an electric circuit comprising an emitter for wireless communication to send at least one signal, and a receiver in wireless connection with the emitter, wherein the connection device comprises a magnet arranged on the roll holder to perform, at each turn of a pin of the roll holder, a cyclic movement which first includes a lifting of the magnet, caused by a rotation of the pin of a fraction of a turn, and then a falling of the magnet, the electric circuit being arranged to be energized by the magnet when the falling occurs.

* * * * *